Figure 1:
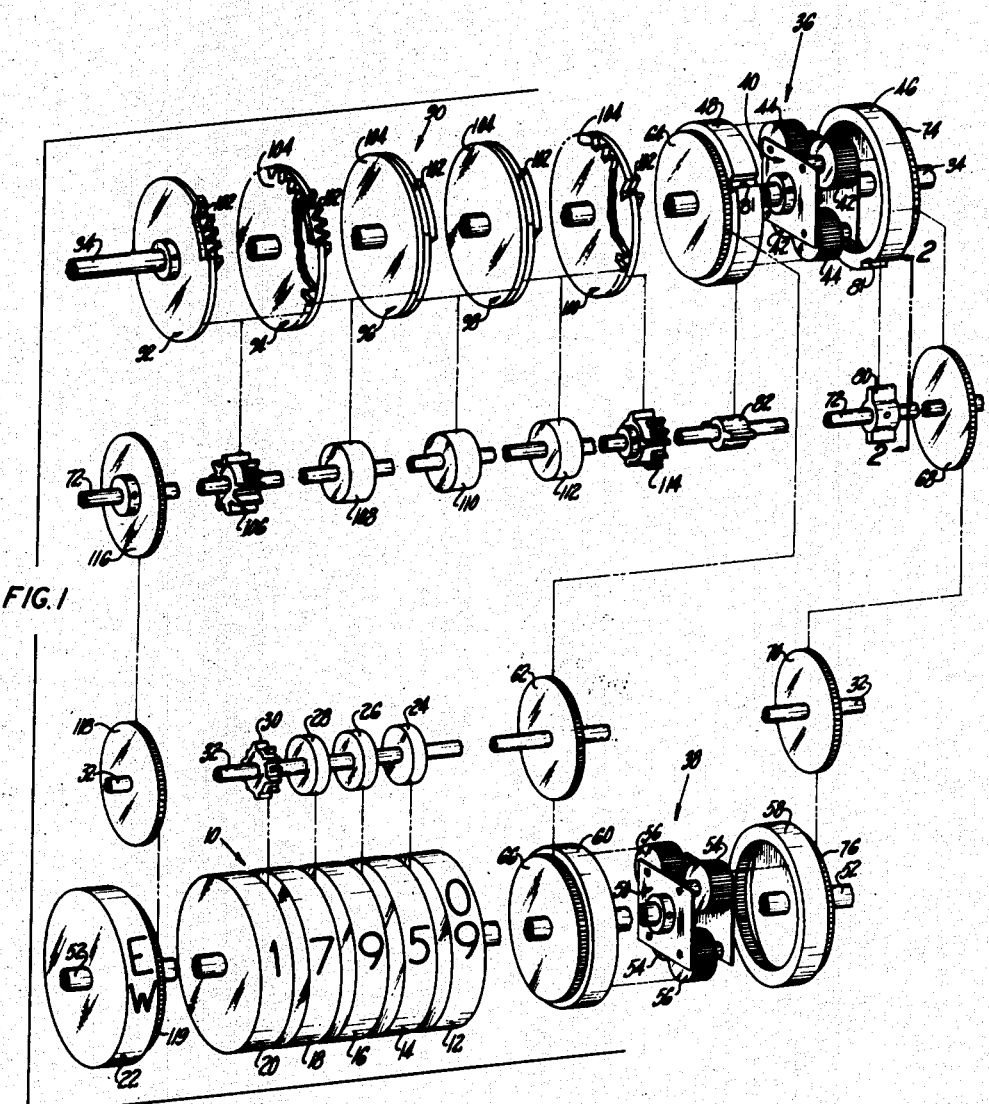

June 22, 1965  R. H. DEVANNEY  3,190,552

DRIVE SEQUENCING MECHANISM

Filed Dec. 20, 1962

INVENTOR.
RAYMOND H. DEVANNEY

BY Lindsay, Deutzman and Hayes

ATTORNEYS

United States Patent Office 3,190,552
Patented June 22, 1965

3,190,552
DRIVE SEQUENCING MECHANISM
Raymond H. Devanney, Berlin, Conn., assignor to Veeder-Root Incorporated, Hartford, Conn., a corporation of Connecticut
Filed Dec. 20, 1962, Ser. No. 246,238
26 Claims. (Cl. 235—132)

This invention relates to a drive sequencing mechanism for automatically altering the speed and/or rotational direction of a drive shaft in accordance with a preselected program of speeds, directions and duration.

It is a principal aim of this invention to provide a new and improved drive sequencing mechanism of the type described which is adaptable for sequencing the rotational movement of a drive shaft through one or more changes in speed and/or direction and which is equally useful for sequencing a drive having high torque and high speed as well as a drive of comparatively low torque and low speed. Included within this aim is the provision of a sequencing mechanism having a mechanical mechanism for controlling the rotational movement of the drive and which may be programmed to provide drive change-overs after the drive shaft has revolved a preselected number of revolutions.

It is another aim of the present invention to provide a sequencing mechanism of the type described which is capable of providing a drive change-over with a minimum of lost motion and without the necessity of shifting the driving parts of the drive mechanism during the change-over. Preferably the sequencing mechanism utilizes a gear train to rotate the drive shaft with the gear train controlled to effect a drive change-over without the shifting of gears.

It is a further aim of the present invention to provide a sequencing mechanism for automatically reversing a rotating driven shaft after a preselected number of shaft revolutions without a directional change in the driving shaft and wherein the directional change-over is accomplished smoothly and rapidly and with a minimum of lost motion between the driving and driven shafts.

It is a still further aim of the present invention to provide a sequencing mechanism of the type described which may be readily programmed for preselecting the duration between and the timing of drive change-overs and which may be compactly constructed of parts capable of providing long service, free of maintenance or parts replacement.

Other objects will be in part obvious, and in part pointed out more in detail hereinafter.

The invention accordingly resides in the features of construction, combination of elements and arrangement of parts which will be exemplified in the construction hereafter set forth and in the scope of the application as indicated in the appended claims.

Figure 2:
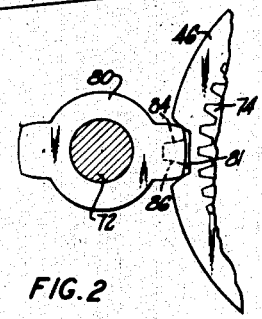

In the drawings:

FIG. 1 is an exploded perspective view of an embodiment of a sequencing mechanism of the present invention; and FIG. 2 is an enlarged section view taken along the line 2—2 of FIG. 1.

In accordance with the present invention, an embodiment of the drive sequencing mechanism is shown in FIGS. 1 and 2 for sequencing a drive to a navigational counter used to register the East and West longitude of an aircraft, ship, or the like, and wherein the degrees and minutes of longitude, either East or West, are shown on the counter.

Referring now to FIG. 1, the navigational counter generally designated by the numeral 10 has five counter wheels 12, 14, 16, 18 and 20 for registering longitude, either East or West, from 000°-00′ to 180°-00′, with the East or West hemisphere being indicated by an additional rotary wheel 22. As a ship or aircraft proceeds eastwardly from 000°-00′ longitude for example, the counter 10, to register the movement of the ship or aircraft, shows an increase in East longitude to 180°-00′, at which point, with the ship or aircraft continuing in an eastwardly direction, the counter must register a decreasing West longitude from 180°-00′ and consequently the counter 10 must be reversed as the ship or aircraft reaches the 180° meridian. For the same reasons the counter must be reversed as the ship or aircraft passes through the prime meridian. Additionally, the hemisphere indicator wheel 22 must be indexed with the reversing of the counter to appropriately register the passage from one hemisphere to the other. Of course, when a ship or aircraft travels in the westerly direction a similar reversal of the counter at 180°-00′ and at 000°-00′ must be accomplished. Inasmuch as the input to the counter, as from a navigational computer, does not normally reverse at the prime meridian and at the 180°-00′ meridian, the counter must be automatically reversed at these meridians.

The counter 10 includes the conventional transfer pinions 24, 26, 28 and 30 rotatably mounted on pinion shaft 32 for providing the transfer from the indicator wheels of lower order to the adjacent wheels of higher order and, excepting for the transfer between the rotary wheels 14 and 16, the rotary wheels are indexed one indicia as the adjacent indicator of lower order passes between 9 and 0. As the indicator wheel 14 is the second place indicator for registering minutes, it will have on the face thereof the numerals between 0 and 5, and accordingly a transfer between the minutes indicator 14 to the lowest order degrees indicator 16 will be generated as the minutes wheel 14 passes between 5 and 0.

The counter 10 is driven from an input shaft 34 through a pair of drive trains including the operatively connected driving and driven elements in the differentials 36 and 38. The carrier 40 of the differential 36 is fixed for rotation with the input shaft 34 and rotatably supports two pairs of intermeshing planetary gears 42 and 44 in driving engagement with the sun gears 46 and 48, respectively. Similarly, the differential 38 includes a carrier 50 fixed for rotation with the counter drive shaft 52 and rotatably supports two pairs of intermeshing planetary gears 54 and 56 in driving engagement with the sun gears 58 and 60, respectively.

The sun gear 48 of the differential 36 is adapted to drive the counter shaft 52 in one rotational direction through an idler gear 62 rotatively mounted on the pinion shaft 32 and in engagement with the gears 64 and 66 fixed to the sun gears 48 and 60, respectively. The sun gear 46 is adapted to drive the counter shaft 52 in the opposite rotational direction through the intermeshing idler gears 68 and 70 rotatively mounted on the shaft 72 and the pinion shaft 32, respectively. The idler gears 68 and 70 are in driving engagement with the gears 74 and 76 fixed to the sun gears 46 and 58, respectively. Thus, there are provided two drive paths for driving the lowest order counter wheel 12 in opposite rotational directions, and both drive paths are complete without the necessity of shifting gears. By the proper selection of the number of teeth on the gears in the drive paths, the drive through both drive paths provides the same drive ratio between the input shaft 34 and the counter shaft 52.

The two drive paths between the sun gears 46 and 48 of the differential 36 are controlled by selectively braking or locking the sun gears thereby deactivating one of the drive paths and activating the other drive path. By releasing the locked sun gear and simultaneously locking the other sun gear, the previously deactive drive path will be activated to reverse the counter.

A pair of similar locking pawls 80 and 82 are fixed for rotation with the shaft 72 for rotational movement into locking engagement with the sun gears 46 and 48, respectively. Each locking pawl has two diametrically opposed locking portions angularly spaced on the shaft 72 90° relative to the locking portions of the other pawl. The locking portions are adapted to be received within a recess 81 on the sun gear for locking or braking the sun gear, and preferably have an involute contour similar to a gear sector with two gear teeth 84 and 86 (shown in dotted lines in FIG. 2). The sun gear recess 81 has a complementary involute contour so that engagement and disengagement of the pawl and the sun gear is similar to that of intermeshing gears. Only one of the recesses 81 is shown in the sun gears 46 and 48, however additional recesses may be provided where necessary, and the sun gears 46 and 48 could even be contoured as spur gears with alternate teeth missing so that they be selectively locked in any rotational position.

The locking pawls 80 and 82 are controlled and operated by a control mechanism generally denoted by the number 90 which includes a plurality of rotary elements 92, 94, 96, 98 and 100 all of which are rotatably mounted on the drive shaft 34 excepting the rotary element 92 which is fixed for rotation therewith. Each of the rotary elements has fixed thereto a transfer gear sector 102 and the rotary elements 94, 96, 98 and 100 have additionally fixed thereto transfer spur gears 104. A plurality of transfer pinions 106, 108, 110 and 112 rotatably mounted on the shaft 72 engage the spur gears 104 and gear sectors 102 for generating a transfer between the rotary elements. An additional transfer pinion 114 fixed for rotation with the shaft 72 is driven by the transfer gear sector 102 of the rotary element 100 to generate a transfer to the shaft 72 for rotating the locking pawls 90° and thereby deactivate one drive path and activate the other drive path from the differential 36.

By properly choosing the number of transfer teeth on the gear sectors 102 and the number of rotary elements in the storage mechanism the actuation of the locking pawls 80 and 82 may be preselected so that a transfer to the shaft 72 is generated to deactivate one of the drive paths and activate the other drive path in proper timed relationship with the movement of the counter. Such activation and deactivation of the drive paths is accomplished with minimum loss motion between the input shaft 34 and the counter drive shaft 52 inasmuch as one of the locking pawls is brought into engagement with its corresponding sun gear as the other locking pawl is moved out of engagement with its corresponding sun gear. The storage mechanism 90 is accordingly constructed to generate a transfer to the shaft 72 as the counter increases through 179°–59' to 180°–00' and as the counter decreases through 000°–01' to 000°–00' thereby automatically reversing the counter at the prime meridian and at the 180°–00' meridian.

Concurrently with the 90° rotation of the pawls 80 and 82 for reversing the counter, a spur gear 116 fixed to the pawl shaft 72 is rotated to index the hemisphere indicator 22 through an idler gear 118 rotatably mounted on the pinion shaft 32 and engaging a gear 119 fixed to the hemisphere indicator. Accordingly, simultaneously with the reversal of the counter 10 the hemisphere indicator is indexed to register passage from one hemisphere to the other.

Although the preferred embodiment of this invention concerns the sequencing of the drive of a navigational counter, thereby exemplifying the manifold advantages of the present invention, other embodiments are contemplated with devices wherein it is desirable to effect a change in the speed or direction of a rotating shaft or for maintaining a shaft motionless for a preselected duration.

It can be seen, therefore, that the sequencing mechanism of the present invention has utility in numerous driving mechanisms for sequencing the rotational movement of a drive shaft in accordance with a preselected program, and may be readily programmed by merely changing the rotary wheels within the storage mechanism. Further, the sequencing mechanism of the present invention provides a compact arrangement of parts providing a rapid change-over from one drive path to another drive path with minimum lost motion and without the shifting of gears.

As will be apparent to persons skilled in the art, various modifications and adaptations of the structure above described will become readily apparent without departure from the spirit and scope of the invention, the scope of which is defined in the appended claims.

I claim:

1. A counter mechanism comprising a counter having a plurality of counterwheels and transfer means therebetween, an input shaft, a first differential having a driving element operably connected to the input shaft and a pair of driven elements, a second differential having a driven element operably connected to the counter and a pair of driving elements, transmission means operably connecting the pair of driven elements of the first differential with the pair of driving elements of the second differential thereby providing two drive paths between the input shaft and counter, a drive control mechanism having a rotary input member operable for initiating a change in the drive of the counter, a rotary output member and means interconnecting the input and output members, said interconnecting means operatively connecting the output member with the input member after preselected movement of the input member, and drive selecting means driven by the output member of the drive control mechanism selectively activating the first and second drive paths whereby after the preselected movement of the input member of the drive control mechanism the drive selecting means is actuated to deactivate one of the drive paths and activate the other drive path to the 2. A counter mechanism comprising a counter having a plurality of counterwheels and transfer means therebetween, an input shaft, a first differential having a rotary driving element operably connected to the input shaft and a pair of rotary driven elements, a second differential having a rotary driven element operably connected to the counter and a pair of rotary driving elements, transmission means operatively connecting the pair of rotary driven elements of the first differential with the pair of rotary driving elements of the second differential respectively to provide first and second drive paths between the input shaft and counter, a pair of operatively connected rotary locking pawls positioned for rotary movement for locking the first and second drive paths respectively, said locking pawls each having a pair of diametrically opposed locking parts with the locking parts of one pawl operably displaced 90° relative to the other pawl, a drive control mechanism having a rotary input member operable for initiating a change in the drive of the counter, a rotary output member and means interconnecting the input and output members, said interconnecting means operatively connecting the output member with the input member after preselected movement of the input member, and means drivingly connecting the output member with the pawls whereby after the preselected movement of the input member of the drive control mechanism, the output member thereof actuates the pawls to effect a change in the drive path to the counter.

3. A counter mechanism comprising a counter having a plurality of counterwheels and transfer means therebetween, an input shaft, a first differential having a rotary driving element operably connected to the input shaft and a pair of rotary driven elements, a second differential having a rotary driven element operably connected to the counter and a pair of rotary driving elements, transmission means operatively connecting the pair of rotary driven elements of the first differential with the pair of rotary driving elements of the second differential respectively thereby providing two drive paths between the input shaft and counter, a pair of operatively connected rotary locking pawls positioned for rotary movement for locking the first and second drive paths respectively, and a drive control mechanism having a rotary input member operatively connected to the input shaft, a rotary output member operably driving the rotary locking pawls and means interconnecting the input and output members, said interconnecting means operatively connecting the output member with the input member after preselected movement of the input member whereby after the preselected movement of the input member the rotary locking pawls are rotated to deactivate one of the drive paths and activate the other drive path to the counter.

4. A drive sequencing mechanism comprising an input shaft, an output shaft, a differential mechanism having three operatively connected differentially driven elements, transmission means operatively connecting one of said elements with one of the shafts and the other two of said elements with the other of said shafts thereby providing first and second drive paths between the input shaft and output shaft, a drive control mechanism having a rotary input element operable for initiating a change in the drive path to the output shaft, a rotary output element and means interconnecting the rotary input and output elements, said interconnecting means operatively connecting the output element with the input element after preselected movement of the input element, and drive selecting means operable by the rotary output element for activating at least one of the drive paths whereby after the preselected movement of the rotary input element of the drive control mechanism the drive selecting means is actuated to activate said one drive path.

5. A drive sequencing mechanism comprising an input shaft, a drive shaft, a differential mechanism having three operatively connected differentially driven elements, means connecting a first of the differential elements with one of the shafts and a second and third of the differential elements with the other of said shafts thereby providing two drive paths between the input shaft and drive shaft, a drive control mechanism having a rotary input member operable for initiating a change in the drive path to the drive shaft, a rotary output member and means interconnecting the rotary input and output members, said interconnecting means operatively connecting the output member with the input member after preselected movement of the input member, and drive selecting means operatively driven by the rotary output member selectively braking the second and third differential elements for effecting a change in the drive path to the drive shaft.

6. A drive sequencing mechanism comprising an input shaft, a drive shaft, a differential mechanism having three operatively connected differentially driven elements, transmission means operably connecting a first of the differential elements with one of the shafts and a second and third of the differential elements with the other of said shafts thereby providing two drive paths between the input shaft and drive shaft, a drive control mechanism having a rotary input member operable for initiating a change in the drive path to the counter, a rotary output member and means interconnecting the rotary input and output members, said interconnecting means operatively connecting the output member with the input member after preselected movement of the input member, a rotary locking pawl positioned for rotary movement into locking engagement with one of the drive paths, and means operatively connecting the locking pawl with the rotary output member of the drive control mechanism whereby after the preselected movement of the rotary input member the locking pawl is actuated to effect a change in the drive of the drive shaft.

7. A drive sequencing mechanism comprising an input shaft, an output shaft, a differential mechanism having three operatively connected differentially driven elements, transmission means operably connecting a first of the differential elements with one of the shafts and a second and third of the differential elements with the other of said shafts thereby providing first and second drive paths between the input shaft and output shaft, first and second operatively connected rotary locking pawls positioned for rotary movement for locking the first and second drive paths respectively, and a drive control mechanism having a rotary input member operable for initiating a change in the drive path to the counter, a rotary output member operably connected to the first and second locking pawls and means interconnecting the rotary input and output members, said interconnecting means operatively connecting the output member with the input member after preselected movement of the input member whereby the first and second locking pawls are actuated to effect a change in the drive path between the input shaft and output shaft after the preselected movement of the rotary input member of the drive control mechanism.

8. A drive sequencing mechanism comprising an input shaft, a drive shaft, a differential mechanism having three coaxial operatively connected differentially driven rotary elements, transmission means connecting a first of the differential elements with one of the shafts and a second and third of the differential elements with the other of said shafts thereby providing two drive paths between the input shaft and drive shaft, first and second coaxial rotary locking pawls positioned for rotary movement into locking engagement with the second and third differential elements respectively, said locking pawls being angularly displaced to provide individual locking of the differential elements, and a drive control mechanism having a rotary input member operatively connected to the input shaft, a rotary output member operatively connected to the locking pawls and means interconnecting the rotary input and output members, said interconnecting means operatively connecting the output member with the input member after preselected movement of the input member whereby a change in the drive path between the input shaft and drive shaft is effected by the locking pawls after the preselected movement of the rotary input member of the drive control mechanism.

9. A drive sequencing mechanism comprising an input shaft, a drive shaft, a first differential having a driving element operatively connected to the input shaft and a pair of driven elements, a second differential having a driven element operatively connected to the drive shaft and a pair of driving elements, means operatively connecting the pair of driven elements of the first differential with the pair of driving elements of the second differential thereby providing two drive paths between the input shaft and drive shaft, a drive control mechanism having a rotary input member operable for initiating a change in the drive path to the counter, a rotary output member and means interconnecting the rotary input and output members, said interconnecting means operably connecting the output member with the input member after preselected movement of the input member, and drive selecting means operatively driven by the rotary output member selectively activating the drive paths whereby a change in the drive path to the drive shaft is effected by the drive selecting means after the preselected movement of the input member of the drive control mechanism.

10. A drive sequencing mechanism comprising an input shaft, a drive shaft, a differential mechanism having three coaxial operatively connected differentially driven rotary elements, transmission means operably connecting a first of the differential elements with one of the shafts and a second and third of the differential elements with the other of said shafts thereby providing two drive paths between the input shaft and drive shaft, first and second coaxial rotary locking pawls positioned for rotary movement into locking engagement with the second and third differential elements respectively, said first and second locking pawls being angularly displaced to provide substantially simultaneous locking and unlocking of the drive paths, and drive control means operably driving the rotary locking pawls for selecting the drive path between the input shaft and drive shaft.

11. The drive sequencing mechanism of claim 10 wherein the rotary locking pawls and the second and third differential elements are respectively contoured to provide gear-type intermeshing therebetween for locking the differential elements.

12. A drive sequencing mechanism comprising an input shaft, a drive shaft, a differential mechanism having three operatively connected differentially driven elements, means connecting a first of the differential elements with one of the shafts and a second and third of the differential elements with the other of said shafts thereby providing two drive paths between the input shaft and drive shaft, a drive control mechanism having a plurality of coaxial rotary gear members and a plurality of rotary transfer pinions engageable therewith for generating movement between the rotary members, one of said rotary members being driven for initiating a change in the drive path to the drive shaft, and control means operable by another of said rotary members activating one of said drive paths whereby after preselected movement of the one rotary member a transfer is generated to said another rotary member for activating the one drive path.

13. A drive sequencing mechanism comprising an input shaft, a drive shaft, a differential mechanism having three coaxial operatively connected differentially driven rotary elements, transmission means connecting a first of the differential elements with one of the shafts and a second and third of the differential elements with the other of said shafts thereby providing two drive paths between the input shaft and drive shaft, a control shaft, a pair of rotary locking pawls connected for rotation with the control shaft, each of said locking pawls having diametrically opposed locking parts with the locking parts of one pawl being operably displaced 90° relative to the locking parts of the other pawl, and a drive control mechanism having a rotary input member operable for initiating a change in the drive path to the drive shaft, a rotary output member operably driving the control shaft and means interconnecting the rotary input and output members, said interconnecting means operatively connecting the output member with the input member after preselected movement of the input member whereby after the preselected movement of the input member the output member of the drive control mechanism is actuated to rotate the pawls to effect a change in the drive path to the drive shaft.

14. A mechanical sequencing mechanism comprising an input shaft, an output shaft; a differential mechanism having a rotary driving element operatively connected to the input shaft, a rotary driven element operatively connected to the output shaft and a rotary control element; a drive control mechanism having a rotary input member operable for initiating a change in the drive of the output shaft, a rotary output member and means interconnecting the rotary input and output members, said interconnecting means operatively connecting the output member with the input member after preselected rotary movement of the input member, and means operatively driven by the rotary output member for locking the rotary control element of the differential whereby after the preselected movement of the input member of the drive control mechanism the output member thereof is operated to effect locking of the rotary control element to activate the drive path to the output shaft.

15. A mechanical sequencing mechanism comprising an input shaft, an output shaft, a differential mechanism having three differentially connected elements including a driving element operatively connected to the input shaft, a driven element operatively connected to the output shaft and a control element; a drive control mechanism having a rotary input member operable for initiating a change in the drive of the output shaft, a rotary output member and means interconnecting the rotary input and output members, said interconnecting means operatively connecting the output member with the input member after preselected movement of the rotary input member, and means for effecting speed control of the control element operatively driven by the rotary output member whereby after the preselected movement of the rotary input member of the drive control mechanism the means for effecting speed control is actuated by the rotary output member to effect a change in the speed between the input and output shafts.

16. A counter mechanism comprising a counter having a plurality of counterwheels and transfer means therebetween, a rotary drive member, a differential mechanism having a rotary driving element operably connected to the rotary drive member and a pair of rotary driven elements, transmission means operably connecting the rotary driven elements and the counter for providing two drive paths between the rotary drive member and counter; a drive control mechanism having a rotary input element operable for initiating a change in the drive path of the counter, a rotary output element and means interconnecting the rotary input and output elements, said interconnecting means operably connecting the output element with the input element after preselected rotary movement of the input element; and drive selecting means operable by the rotary output element activating at least one of the drive paths whereby after the preselected movement of the input element of the drive control mechanism the output element thereof operates the drive selecting means to activate said one drive path.

17. The counter mechanism of claim 16 wherein the drive selecting means comprises a rotary locking element positioned for activating said one drive path and means operatively connecting the rotary output element of the drive control mechanism with the locking element.

18. A navigational counter mechanism comprising a rotary counter having a plurality of coaxial counterwheels and transfer means therebetween, a hemisphere indicator wheel mounted coaxially with the counterwheels, an input rotary member, a differential mechanism having a rotary driving element operably connected to the input rotary member and a pair of rotary driven elements, transmission means operably connecting the rotary driven elements and the counter providing two drive paths between the input rotary member and counter for driving the counter in reverse rotational directions respectively; and a drive path control mechanism comprising a plurality of coaxial control wheels of increasing order and transfer means therebetween, means operably connecting the lowest order control wheel and the input rotary element, and drive reversing means operably driven by the highest order control wheel for selectively activating the drive paths to the counter and for indexing the hemisphere wheel.

19. The navigational counter mechanism of claim 18 wherein the drive reversing means comprises a control shaft, a pair of rotary locking elements mounted on the control shaft and positioned for rotary movement for selectively activating said drive paths, means operably connecting the highest order control wheel and control shaft, and means driven by the control shaft for indexing the hemisphere wheel.

20. A drive sequencing mechanism comprising a rotary input shaft, a rotary output shaft, a differential gear mechanism having a rotary driving gear operably connected to the input shaft and a pair of rotary driven gears, gear transmission means operably connecting the rotary driven gears and the output shaft providing two drive paths between the input and output shafts, and a drive control mechanism comprising a plurality of coaxial gear elements of increasing order, transfer pinions operably connecting said gear elements, means operatively connecting the lowest order gear element with the input shaft, and drive path selection means driven by the highest order gear element.

21. The drive sequencing mechanism of claim 20 wherein the drive path selection means comprises a pair of coaxial rotary locking elements positioned for rotary movement for selectively activating said drive paths, and means operably connecting the rotary locking elements with the highest order gear element.

22. A counter mechanism comprising, a counter having a plurality of counterwheels and transfer means therebetween, a rotary drive member, transmission means operably connecting the rotary drive member and the counter providing two drive paths therebetween; said transmission means including first and second differentials each having planetary gear means, carrier means for the planetary gear means, and a pair of gears in mesh with the planetary gear means, and means operably connecting the pair of gears of the first differential with the pair of gears of the second differential respectively to provide said two drive paths; a drive control mechanism having a rotary input element driven by the rotary drive member and operable for initiating a change in the drive path of the counter, a rotary output element and means interconnecting the rotary input and output elements, said interconnecting means operably connecting the output element with the input element after preselected rotary movement of the input element; and drive selecting means operable by the rotary output element alternately activating said drive paths whereby after the preselected movement of the input element of the drive control mechanism the output element thereof operates the drive selecting means to change the drive path to the counter.

23. A drive sequencing mechanism comprising, a rotary drive member, a rotary driven member, transmission means operably connecting the rotary drive member and the rotary driven member providing two drive paths therebetween; said transmission means including first and second differentials each having planetary gear means, carrier means for the planetary gear means, and a pair of gears in mesh with the planetary gear means, and means operably connecting the pair of gears of the first differential with the pair of gears of the second differential respectively to provide said two drive paths; a drive control mechanism having a rotary input element driven by the rotary drive member and operable for initiating a change in the drive path of the counter, a rotary output element and means interconnecting the rotary input and output elements, said interconnecting means operably connecting the output element with the input element after preselected rotary movement of the input element; and drive selecting means operable by the rotary output element alternately activating said drive paths whereby after the preselected movement of the input element of the drive control mechanism the output element thereof operates the drive selecting means to change the drive path to the rotary driven member.

24. A drive sequencing mechanism comprising an input shaft, a drive shaft, a pair of differentials; each of said differentials comprising planetary gear means, a rotatable carrier element rotatably supporting said planetary gear means and a pair of rotatable gear elements in operative engagement with said planetary gear means; transmission means operatively connecting the pair of differentials between the input and drive shafts providing a pair of drive paths therebetween adapted for activation by locking respectively a first and a second of said rotatable elements of the differentials against rotation, locking means for alternately locking and unlocking said first and said second rotatable elements against rotation including first and second operatively connected rotary locking pawls respectively operable to provide substantially simultaneous locking and unlocking of said first and second rotatable elements upon rotary movement of the locking pawls, and drive control means driven by the input shaft for rotating the locking pawls for controlling the drive between the input and drive shafts.

25. A counter mechanism comprising a rotary counter having a plurality of counter wheels and transfer means therebetween, a rotary drive member, a pair of differentials; each of said differentials comprising planetary gear means, a rotatable carrier element rotatably supporting said planetary gear means and a pair of rotatable gear elements in operative engagement with said planetary gear means; transmission means operatively connecting the pair of differentials between the rotary drive member and the rotary counter providing a pair of drive paths therebetween adapted for driving the counter in opposite rotational directions and adapted for activation by locking respectively a first and a second of said rotatable elements of the differentials against rotation, locking means for alternately locking and unlocking said first and second rotatable elements for selectively activating the pair of drive paths respectively, and control means driven by said rotary drive member for operating said locking means for alternately locking and unlocking said first and second rotary elements respectively for reversing the counter.

26. A counter mechanism comprising a rotary counter having a plurality of counter wheels and transfer means therebetween, a rotary drive member, a pair of differentials; each of said differentials comprising planetary gear means, a rotatable carrier element rotatably supporting said planetary gear means and a pair of rotatable gear elements in operative engagement with said planetary gear means; transmission means operatively connecting the pair of differentials between the rotary drive member and the rotary counter providing a pair of drive paths therebetween adapted for activation by locking respectively a first and a second of said rotatable elements of the differentials against rotation, locking means for alternately locking and unlocking said first and second rotatable elements for selectively activating the pair of drive paths respectively comprising first and second operatively connected rotary locking elements positioned for rotary movement into selective locking engagement with said first and second rotatable elements respectively, and control means driven by said rotary drive member for operating said locking means for alternately locking and unlocking said first and second elements.

References Cited by the Examiner
UNITED STATES PATENTS

| | | | |
|---|---|---|---|
| 2,261,655 | 11/41 | Lowe | 235—61 |
| 2,829,532 | 4/53 | Togstad | 74—321 |
| 3,022,946 | 2/62 | Glass et al. | 235—117 |

LEO SMILOW, *Primary Examiner.*

LEYLAND M. MARTIN, *Examiner.*

UNITED STATES PATENT OFFICE
CERTIFICATE OF CORRECTION

Patent No. 3,190,552                        June 22, 1965

Raymond H. Devanney

It is hereby certified that error appears in the above numbered patent requiring correction and that the said Letters Patent should read as corrected below.

Column 4, line 36, after "the", second occurrence, insert -- counter. --.

Signed and sealed this 7th day of December 1965.

(SEAL)
Attest:

ERNEST W. SWIDER                        EDWARD J. BRENNER
Attesting Officer                         Commissioner of Patents